United States Patent [19]

Takagi

[11] Patent Number: 5,940,237
[45] Date of Patent: Aug. 17, 1999

[54] DISK MEDIUM WHOSE TRACK DENSITY IS CHANGED IN A RADIAL DIRECTION AND DISK APPARATUS USING THE SAME DISK MEDIUM

[75] Inventor: Masahiro Takagi, Kawasaki, Japan

[73] Assignee: Fujitsu Limited, Kawasaki, Japan

[21] Appl. No.: 08/889,003

[22] Filed: Jul. 7, 1997

Related U.S. Application Data

[63] Continuation of application No. 08/488,767, Jun. 8, 1995, abandoned.

[30] Foreign Application Priority Data

Jul. 29, 1994 [JP] Japan ................................ 6-179306

[51] Int. Cl.$^6$ .................................................. G11B 21/02
[52] U.S. Cl. ............................................... 360/75; 369/51
[58] Field of Search ............................... 360/76, 21, 75; 369/51

[56] References Cited

U.S. PATENT DOCUMENTS

| | | |
|---|---|---|
| 4,669,004 | 5/1987 | Moon et al. . |
| 4,802,033 | 1/1989 | Chi .............................................. 360/75 |
| 4,945,427 | 7/1990 | Cunningham .............................. 360/75 |
| 5,073,833 | 12/1991 | Best ...................................... 360/77.08 |

FOREIGN PATENT DOCUMENTS

| | | |
|---|---|---|
| 0347102 | 12/1989 | European Pat. Off. . |
| 57-18060 | 1/1982 | Japan . |
| 61-276110 | 12/1986 | Japan . |
| 1-119910 | 5/1989 | Japan . |
| 2-260103 | 10/1990 | Japan . |
| 4-289576 | 10/1992 | Japan . |
| 5-36038 | 2/1993 | Japan . |
| 89622 | 4/1993 | Japan .................................. 360/77.04 |

OTHER PUBLICATIONS

Submicron–Trackwidth Inductive/MR Composite Head—Hisasahi Takano, Hirotsugu Fukuoka, Mikio Suzuki, Kazuo Shiiki, Masahiro Kitada—Central Research Laboratory, Hitachi Ltd., IEEE Transactions Magnetic vol. 37, No.6, Nov. 1991. Kokubunji, Tokyo 185, Japan.

IBM Technical Disclosure Bulletin, vol. 33, No. 5, Oct. 1990—Zone Recording With Two–Head Slider.

*Primary Examiner*—Aristotelis M. Psitos
*Assistant Examiner*—Alan Faber
*Attorney, Agent, or Firm*—Greer, Burns & Crain, Ltd.

[57] ABSTRACT

A disk apparatus includes a disk medium for recording information in a track provided on the disk medium, a rotation circuit for rotating the disk medium, and a head for recording-and-reproducing to-and-from the disk medium. The head further includes a recording head element and a reproducing head element arranged along the track at a given gap from each other. The disk apparatus further includes a driving control circuit for swinging the head to a given position in a radial direction of the disk medium. In the disk apparatus, the disk medium is formatted by changing a track pitch in the radial direction of the disk medium.

15 Claims, 11 Drawing Sheets

DISK MEDIUM WHOSE TRACK DENSITY IS CHANGED IN A RADIAL DIRECTION AND DISK APPARATUS USING THE SAME DISK MEDIUM

This application is a continuation of application Ser. No. 08/488,767 filed on Jun. 8, 1995 abandoned.

BACKGROUND OF THE INVENTION

1. Field of the Invention

The present invention generally relates to a disk apparatus and its disk medium and a method of formatting the disk medium, and more particularly, to a disk apparatus and a method of formatting a disk medium which moves a recording-and-reproducing head on the disk medium by using a rotating-type actuator.

2. Description of the Related Art

Recently, as an external storage unit for a computer, etc., a magnetic disk apparatus is widely used. For increasing a storage capacity of the storage unit, it is desired to improve the packing density of a disk medium as a recording medium. For this purpose, a magnetoresistance-effect head (MR head) using a magnetoresistive element (MR element) is also in use. Also, in use of such a MR head, it is desired to realize a high packing density of the disk medium. For this purpose, a track pitch in the disk medium needs to be decreased as much as possible.

FIG. 1 shows a top plan view of an example of the conventional magnetic disk apparatus. In a magnetic disk apparatus 11 shown in FIG. 1, an actuator 12 comprises an arm 13, a supporting spring 13a connected to the arm 13, and a magnetic head 14 mounted at a top end of the supporting spring 13a. A basic part of the arm 13 is supported by a pivot 15, which allows the arm 13 to be freely rotated.

On an opposite side of the pivot 15 of the arm 13, a rotation supporting part 16 is formed, and a coil 17 is wrapped around the rotation supporting part 16. Under the coil 17, two magnets 18a, 18b are fixed. The coil 17 and the magnets 18a, 18b construct a voice coil motor (VCM).

The arm 13 of the actuator 12 is rotated by a current flow to the coil 17 from a wiring board 21 through a flexible print board 22. This allows movement of the magnetic head 14 in a radial direction of a magnetic disk 20. The disk is supported by a spindle 19 of a sensorless-type spindle motor. The disk is rotated by the spindle 19.

For the magnetic head 14, though the MR head having the MR element is used for high packing density, the MR head can be used only for reproducing. Therefore, in practical use, a composite-thin-film magnetic head, in which the MR head and a recording head (in general, thin-film head) are combined, is used for the magnetic head 14.

FIGS. 2A, 2B show a configuration of the conventional composite-thin-film magnetic head. FIG. 2A shows a perspective view of the head, and FIG. 2B shows a cross-sectional view thereof. In the composite-thin-film magnetic head, a magnetoresistance-effect head (MR head) 31 comprises a rectangular magnetoresistive element (MR element) 33 formed on a non-magnetic substrate 32, pull-out conductive layers 34a, 34b (will be described later), and upper and lower magnetic sealed layers 35a, 35b.

The pull-out conductive layer 34 is cut at a given width in the lengthwise direction of the MR element 33, and is connected to both sides of an MR of the MR element 33. The MR element 33 and the pull-out conductive layer 34 are arranged between the upper magnetic sealed layer 35a and the lower magnetic seal layer 35b and is electrically insulated by non-magnetic insulating layers 36.

On the other hand, a electro/magneto-converter-type recording head (inductive head) 37 of the composite-thin-film magnetic head 14 records information to the magnetic disk 20. In the recording head 37, the upper magnetic sealed layer 35a of the MR head 31 is used as a lower magnetic transducer, and on it, a recording gap 38 including alumina ($Al_2O_3$), an interlayer insulating layer 39 made of thermo-setting resin, a thin-film coil conductive layer (Cu) 40, and an upper magnetic transducer (NiFe) 41 are layered in that order. By the recording gap 38 formed with the upper magnetic transducer and the lower magnetic transducer (the upper magnetic sealed layer) 35a, a horizontal recording of the information is carried out. Further, a protecting insulating layer 42 is formed on the upper magnetic transducer 41.

In this way, the composite-thin-film magnetic head 14 is formed by composing the MR head 31 and the recording head 37 in the lengthwise direction of the track in the magnetic disk 20. Therefore, the recording gap 38 of the recording head 37 and the MR element 33 are located with a gap of an interval L from each other.

In the meantime, when the magnetic head 14 is moved in the radial direction of the magnetic disk 20 by a swinging movement of the actuator 12, a crossing angle (YAW angle) between the track and the above gap L changes in the radial direction of the magnetic disk 20. In a case where the magnetic head is not the composite-thin-film magnetic head but a single inductive head, it is known that in the area of a large YAW angle (outer area or inner area), the packing density can be improved by the track pitch being close (Japanese Laid-Open Patent Application No.55-18060). In the case of the composite-thin-film magnetic head, since there is the interval L between the recording gap 38 and the MR head 33, even if the large YAW angle is obtained in the outer area or the inner area, it is difficult to densify the track pitch.

FIGS. 3A and 3B show illustrations for explaining a conventional method of setting the track pitch. FIG. 4 shows an illustration for explaining a position relationship between the magnetic head and the track in FIGS. 3A, 3B. In FIGS. 3A and 3B, the recording gap 38 of the recording head 37 is represented by a track width of a write core, and the MR element 33 of the MR head 31 is represented by a track width of a read core. The interval between the write core and the read core is L.

As shown in FIG. 3A and FIG. 4, in the composite-type magnetic head 14, if core widths of the write core 37 (38) and the read core 33 are the same and the YAW angle is set to ±10 degree, the core width of the read core 33 is wider than a core width of the track, and extends over a portion of an adjoining track. Therefore, undesired noise from the adjoining track makes the S/N ratio decrease.

To adjust the read core 33 within the core width (a+b+c=d) when the YAW angle is a maximum value ±10 degree, the width of the read core 33 is usually set to a width c (shaded part) based on when the YAW angle is 0 degree.

As shown in FIG. 3B, in the magnetic disk 20, dead spaces DSs are set in both sides of the track so as to prevent signals on adjoining tracks A, C from being erased due to magnetic-head position fluctuating by servo performance degradation, offtrack, and vibration, etc., when writing data on track B.

FIG. 3B shows a case where one side of the write core 37 (38) and one side of the read core 33 are aligned when the YAW angle is maximum (±10 degree). In this case, the dead space DS is set to be equal to or greater than a maximum positioning error according to a positioning accuracy so as not to erase data in the track C when the head is shifted to the track C during writing the data on the track B. An interval between center lines of the two dead space DSs is given the term track pitch TP.

In FIG. 3B, the track pitch TP is set by using the following equations.

The width c of the read core is represented as follows:

$$c=d-[L\cdot\{\tan(\text{maximum YAW angle})-\tan(\text{minimum YAW angle})\}] \quad (1)$$

The second term [L·{tan(maximum YAW angle)−tan(minimum YAW angle)}] of the equation (1) represents a maximum loss with the YAW angle. An actual loss e with the YAW angle is represented as follows:

$$e=L\cdot\tan(|\text{YAW angle}|). \quad (2)$$

Therefore, the track pitch TP is represented as follows:

$$TP=c+e+DS. \quad (3)$$

In the above equation (3), (c+e) is the width d of the write core.

For example, in the case of a magnetic disk of 3.5 inches, the width d of the write core 37 (38) is set to 6 μm, the width c of the read core 33 is set to 4 μm, and the dead space DS is set to 1 to 2 μm. Therefore, the track pitch is 7 to 8 μm, and as a result, the packing density of the magnetic disk 20 is determined.

A narrower track pitch increases the packing density of the magnetic disk 20. The narrower track pitch enables the amount of information per a unit area to increase. However, since the dead space DS is required for the positioning accuracy, it is difficult to decrease the dead space DS. Therefore, the width d of the write core 37 (38) needs to be decreased. However, there is a problem that the width c of the read core 33 is also decreased with the decrease of the width d. Thus, decreased width c makes a read-out signal level decrease.

Another method to compensate the degradation due to the width c of the read core 33 decreasing is by improving head performance, magnetic disk characteristics, and demodulator performance. However, this method makes the magnetic disk apparatus expensive, increases size, and is complex. Thus, there is a problem of increasing the packing density.

SUMMARY OF THE INVENTION

It is an object of this invention to provide a disk apparatus and a method of formatting a disk medium in which packing density of the disk medium is improved and the disadvantages described above are eliminated.

The object described above is achieved by a disk apparatus comprising: a disk medium for recording information in a track; a rotation circuit for rotating the disk medium, a head for recording-and-reproducing to-and-from the disk medium, the head comprising: a recording head element; and a reproducing head element arranged along the track at a given gap from each other; and a driving control circuit for swinging the head to a given position in a radial direction of the disk medium; wherein said disk medium is formatted by changing track pitch in the radial direction of the disk medium.

The object described above is also achieved by a disk apparatus comprising: a disk medium in which tracks are formatted with track pitch being changed in a radial direction of the disk medium; a head for recording-and-reproducing to-and-from the disk medium; a storage circuit for storing track density information according to the track pitch of the disk medium; a processing circuit for obtaining a position of the head based on the servo information which is read out from the track of the disk medium and the track density information derived from the storage circuit, and for producing a drive control signal; and a driving control circuit for swinging the head to a given position in a radial direction of the disk medium according the drive control signal from the processing circuit.

The object described above is also achieved by the disk apparatus mentioned above, wherein in the disk medium formatted, the track pitch is decreased in the direction of the center of the radius of the disk medium.

The object described above is also achieved by the disk apparatus mentioned above, wherein the track pitch is at its minimum at a position where a cross angle between a direction of the gap of the head and a direction of the track at a head position is at its minimum.

The object described above is also achieved by the disk apparatus mentioned above, wherein in the disk medium formatted, the track pitch is sequentially decreased as the cross angle is decreased to its minimum in the radial direction of the disk medium.

The object described above is also achieved by the disk apparatus mentioned above, wherein in the disk medium formatted, the disk medium comprises a plurality of regions in the radial direction, and the track pitch is decreased for each region as the cross angle is decreased to its minimum in the radial direction of the disk medium.

The object described above is also achieved by a method of formatting a disc medium in a disk apparatus for recording information in a track, in which a head including a recording head element and a reproducing head element are arranged along the track at a given gap apart from each other, and includes a driving control circuit for swinging the head to a given position in a radial direction of the disk medium, the method comprising the steps of; (a) obtaining a track pitch at a position of a given track to be formatted in a way that the track pitch is changed in the radial direction; (b) positioning the head to the position based on the track pitch; (c) formatting the given track at the position; and (d) formatting each track in the same way as the steps (a) to (c).

The object described above is also achieved by the method mentioned above, wherein the step (a) comprises a step (a-1) of obtaining the track pitch in a way that the track pitch is decreased from a maximum value of the track pitch being determined based on a positioning accuracy of the head.

The object described above is also achieved by the method mentioned above, wherein the step (a) comprises a step (a-2) of obtaining the track pitch in a way that the track pitch is decreased to its minimum as a cross angle between a direction of the gap of the head and a direction of the track in the radial direction of the disk medium.

The object described above is also achieved by the method mentioned above, wherein the step (a-1) comprises a step (a-3) of obtaining the track pitch by subtracting a margin determined according to the position from the maximum value of the track pitch.

According to the disk apparatus, the disk medium is formatted with the track pitch which is changed in the radial direction of the disk medium from the maximum value of the track pitch being determined based on the positioning accuracy of the head. Therefore, without changing a width of the recording head element, a packing density of the disk medium may be improved.

According to the disk apparatus, the disk medium is formatted with the track pitch changed in the radial direction of the disk medium, and the seek control signal is produced based on the servo information read out from each track and the track density information derived from the storage circuit. This enables improvement of the packing density without changing the width of the recording head element.

According to the disk apparatus, the disk medium is formatted such that the track pitch is decreased sequentially or in a stepping form as the cross angle is decreased to its minimum. Therefore, the packing density of the disk medium is increased without changing the width of the recording head element.

Further, according to the method of formatting the disk medium, the track pitch of the given track to be formatted in the way that the track pitch is changed in the radial direction, and the given track is formatted at the position. Therefore, this method enables improvement of the packing density without changing the width of the recording head element.

Other objects and further features of the present invention will be apparent from the following detailed description when read in conjunction with the accompanying drawings.

DESCRIPTION OF THE PREFERRED EMBODIMENTS

Figure 5:
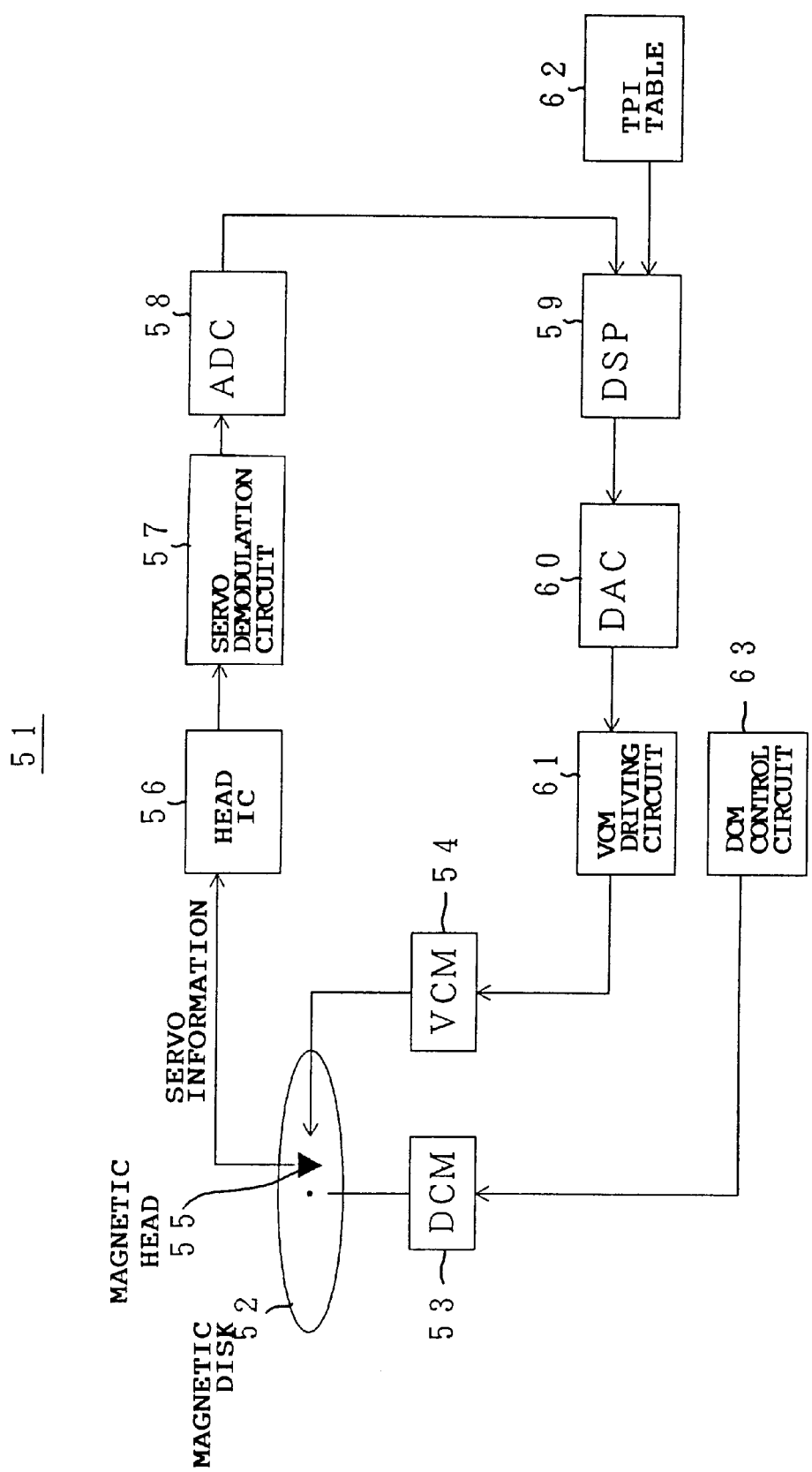
FIG. 5 shows a block diagram of a servo control system of a first embodiment of the disk apparatus according to the present invention.

First, a description will be given of a first embodiment of a disk apparatus according to the present invention, by referring to FIG. 5. FIG. 5 shows a block diagram of a servo control system of the first embodiment of the disk apparatus according to the present invention.

In FIG. 5, a magnetic disk 52 of a disk medium is rotated at a given number of revolutions by a DC motor (DCM) 53, and a magnetic head 55 is moved in a radial direction of the magnetic disk 52 by a voice coil motor (VCM) 54 which constitutes rotation-type driving means.

Figure 1:
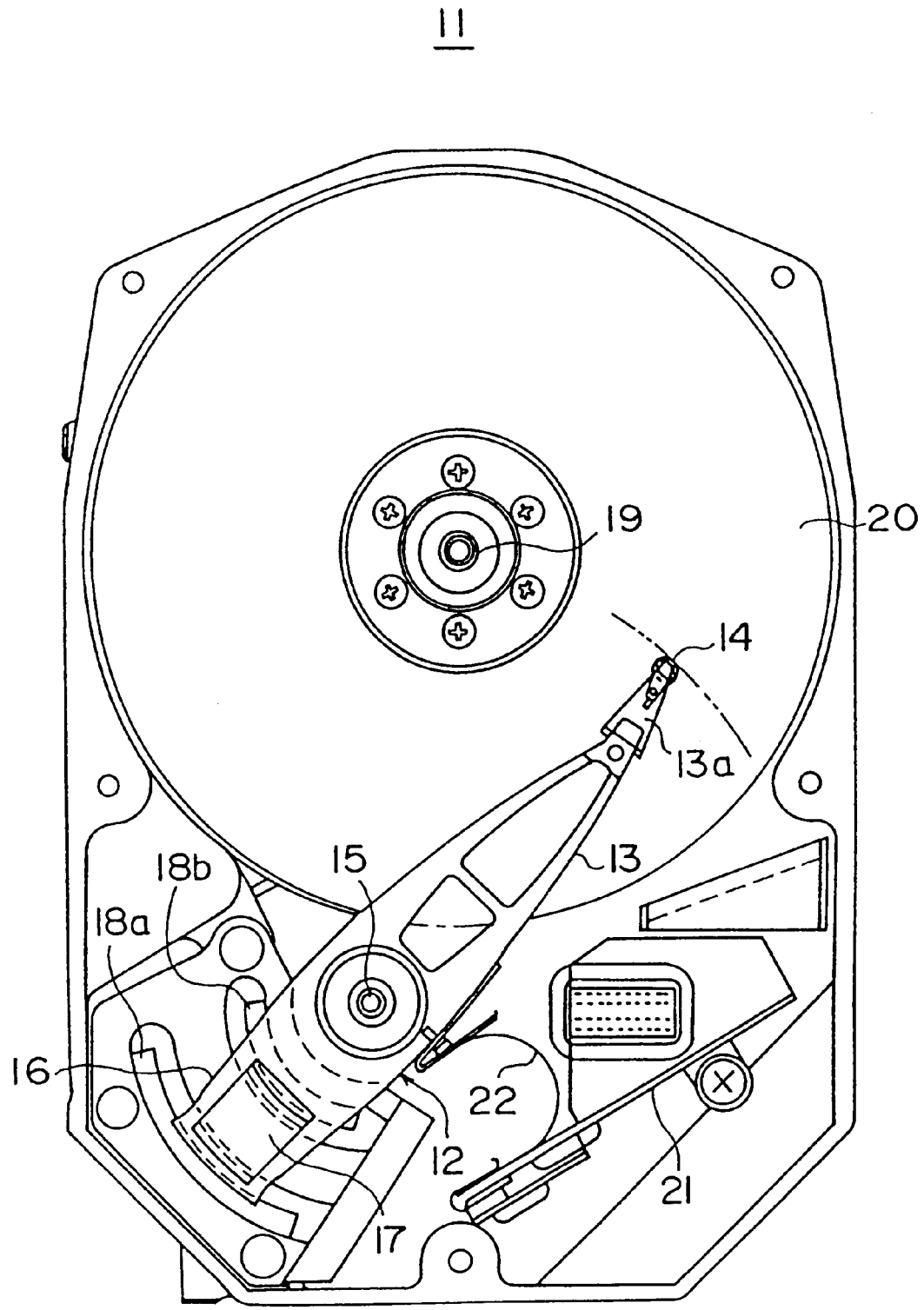
FIG. 1 shows a top plan view of an example of a conventional magnetic disk apparatus.
Figure 2A:
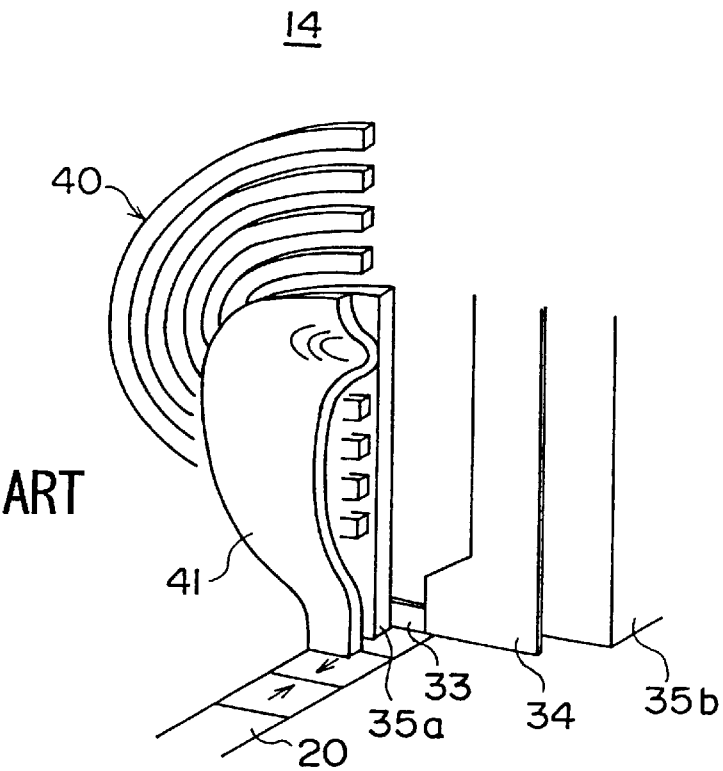
FIGS. 2A, 2B show a configuration of a conventional composite-thin-film magnetic head.
Figure 2B:
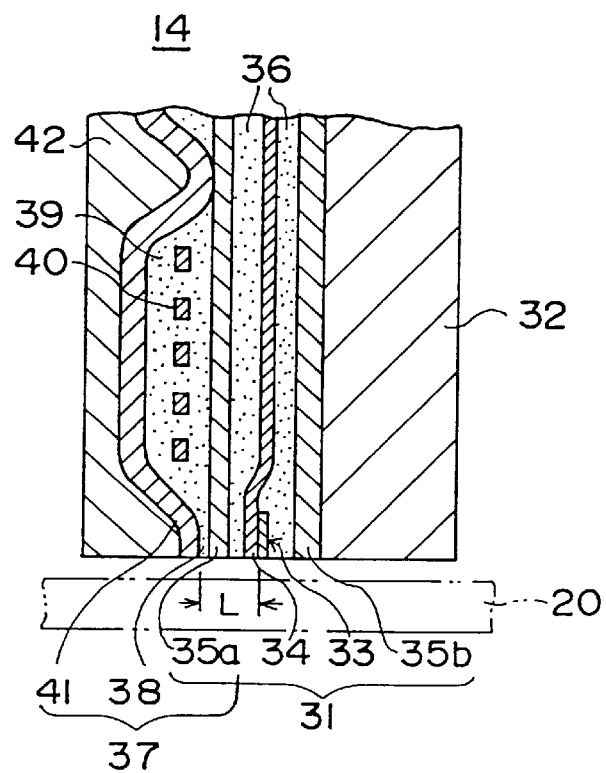

The magnetic head 55 is a composite-thin-film magnetic head in which a thin-film head 55a for recording and an MR head 55b (refer to FIG. 7) are combined as shown in FIGS. 2A, 2B.

A servo signal (servo information) is read out from the magnetic disk 52 by the magnetic head 55, and is transmitted to a servo demodulation circuit 57 through a head IC 56. The servo demodulation circuit 57 converts the servo signal to a position signal indicating position information, and supplies it to an analog-to-digital converter (ADC) 58.

The ADC 58 converts the supplied position signal to a digital signal and transmits it to a digital signal processor DSP 59. To the DSP 59, track-per-inch (TPI) information is also supplied from a TPI table 62. The TPI table 62 is formed by a read only memory (ROM), etc., in which data indicating a relationship of a position in the radial direction of the magnetic disk 52 and the TPI is previously stored.

The DSP 59 produces a digital control signal to drive the VCM 54 based on the information supplied from the ADC 58 and the TPI table 62, the digital control signal being supplied to a digital-to-analog converter (DAC) 60. The DAC 60 converts the digital control signal to an analog signal and transmits it to a VCM driving circuit 61. The VCM is driven according to the analog signal of the control signal. Further, the DCM 53 is controlled to rotate at a constant speed by a DCM control circuit 63.

Figure 6A:
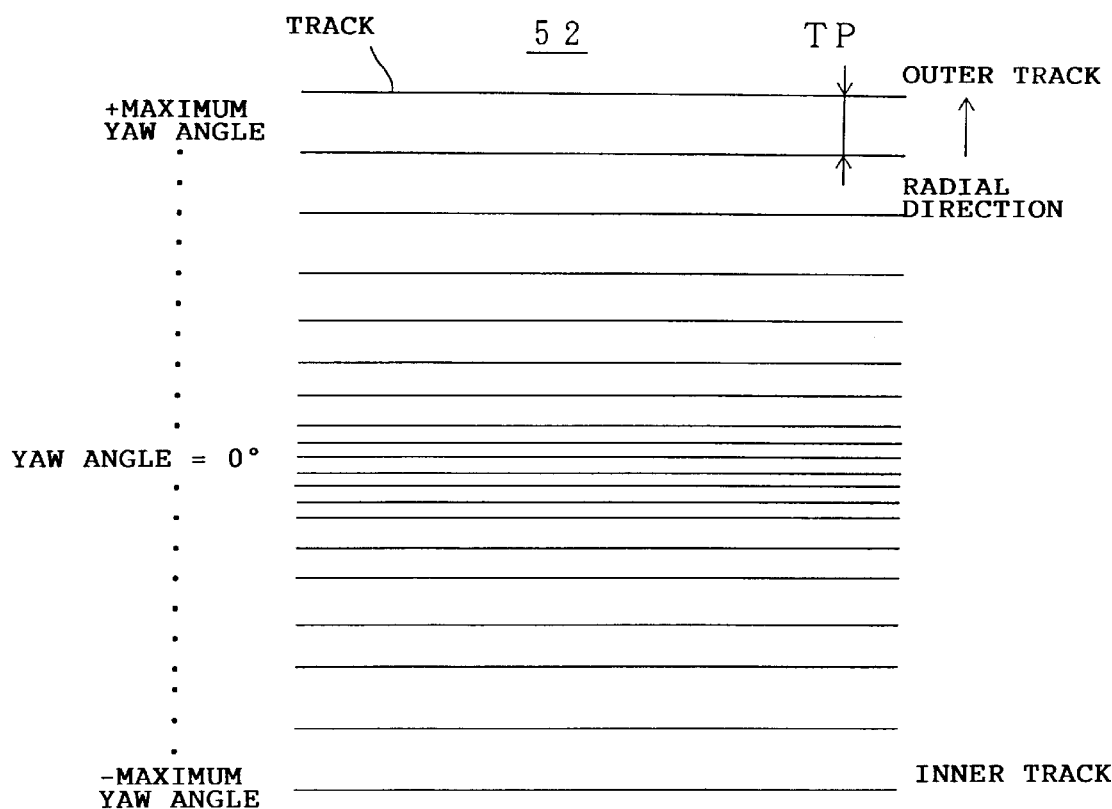
FIG. 6A shows an illustration for explaining a condition of a track pitch of the magnetic disk shown in FIG. 5.
Figure 6B:
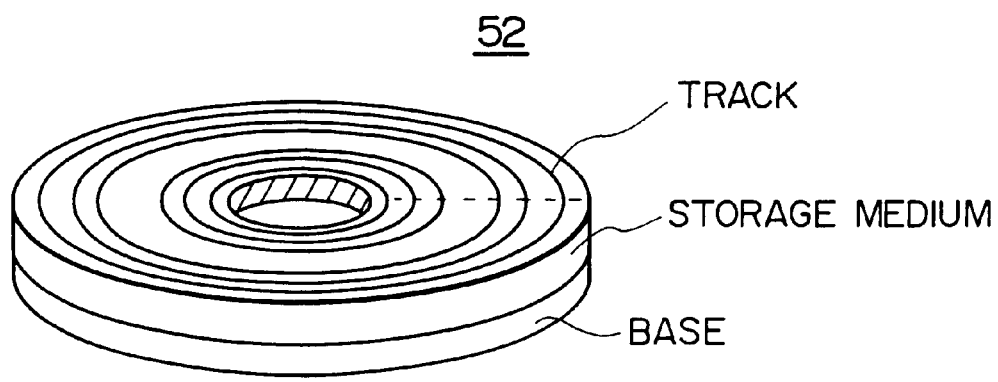
FIG. 6B shows a perspective view of a disk medium according to the present invention.

FIG. 6A shows an illustration for explaining a condition of a track pitch of the magnetic disk 52 shown in FIG. 5 according to the present invention. As shown in FIG. 6B, the magnetic disk 52 is constructed with a storage medium to be formatted and a base supporting the storage medium. As shown in FIG. 6A, in the magnetic disk 52, a YAW angle is maximum at an outer track and an inner track, and the YAW angle is 0 degree at a center track when measured in the radial direction. In the magnetic disk 52 according to the present invention, the largest track pitch (TP) is set at the outer track and the inner track, and the TP decreases in a center direction, i.e. in a radially inward direction. The smallest TP is set at the center track indicating the YAW angle of 0 degree. Thus, the TP has a higher density in directions from the outer track and the inner track toward the center track.

Figure 7:
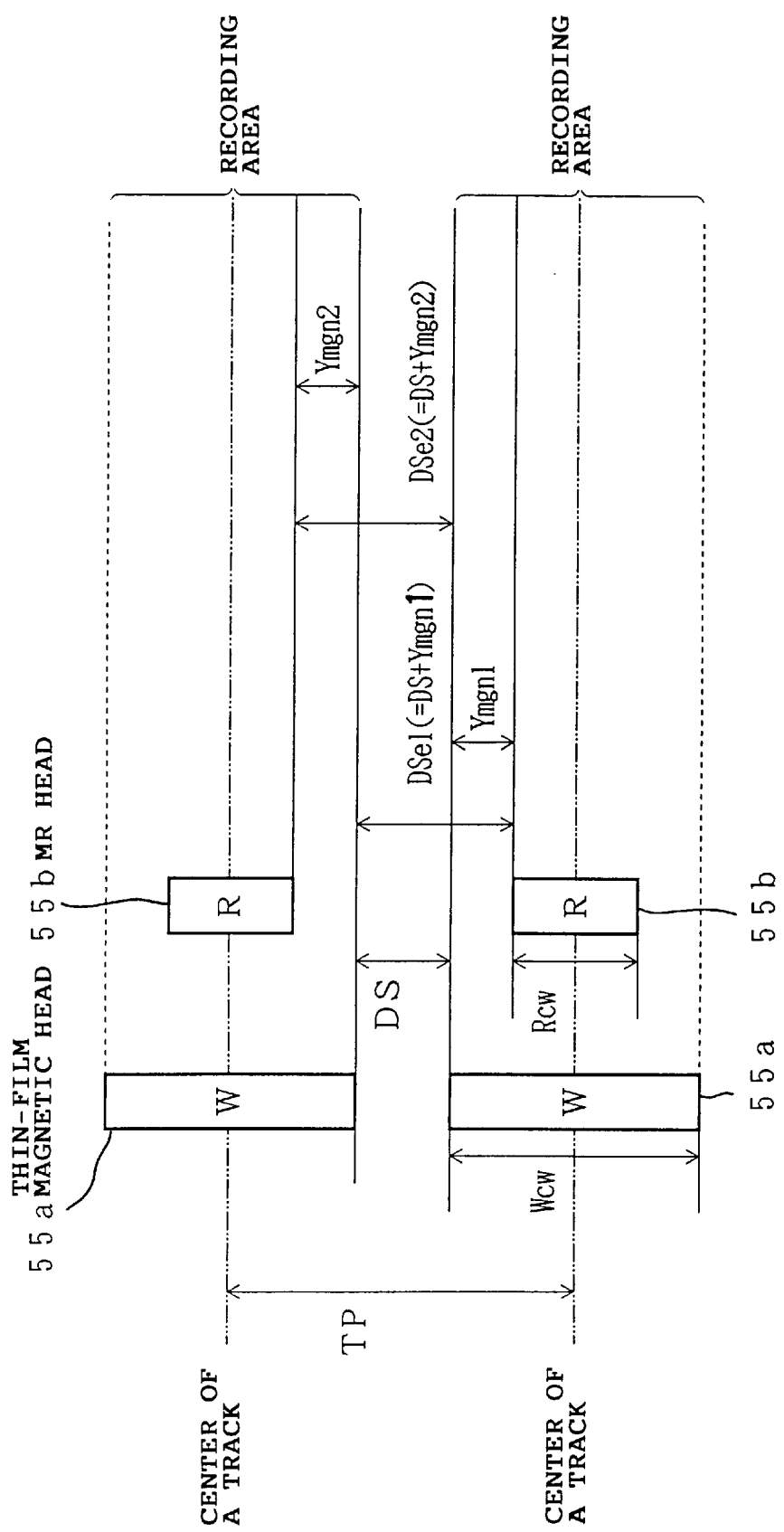
FIG. 7 shows an illustration for explaining a formatting method for setting the track pitch according to the present invention.

FIG. 7 shows an illustration for explaining a formatting method for setting the track pitch according to the present invention. According to the equation (2) mentioned before, the actual loss e with the YAW angle is decreased with a smaller absolute value of the YAW angle, and is zero at the YAW angle of 0 degree. A width c of the MR head 55b is determined at the maximum YAW angle.

The width (Wcw) of the thin-film head 55a as the write core indicates a recording area corresponding to a width of the track. Therefore, one side of the thin-film head 55a indicates a side of the track. An interval between adjoining tracks is represented by a dead space DS for eliminating affects due to head fluctuation, etc. One side of the MR head 55b (width Rcw) is located inside of one side of the thin-film head 55a (width Wcw). Therefore, in the center track (the minimum YAW angle of 0 degree), an actual dead space is determined by adding a difference between the one side of the MR head 55b and the one side of the thin-film head 55a to the dead space DS.

Namely, as shown in FIG. 7, the difference Ymgn1, Ymgn2 between the one side of the MR head 55b and the one side of the thin-film head 55a is used for a margin generated at the minimum YAW angle of 0 degree. Therefore, a space DSe1 (DS+Ymgn1) from the one side of the thin-film head 55a to the one side of the MR head 55b in the adjoining track, and a space DSe2 (DS+Ymgn2) from the one side of the MR head 55b to the one side of the thin-film head 55a in the adjoining track are determined as the actual dead spaces. In fact, if there occurs a difference between the spacers DSe1, DSe2, a smaller one of these spaces is determined as the actual dead space.

Figure 3A:
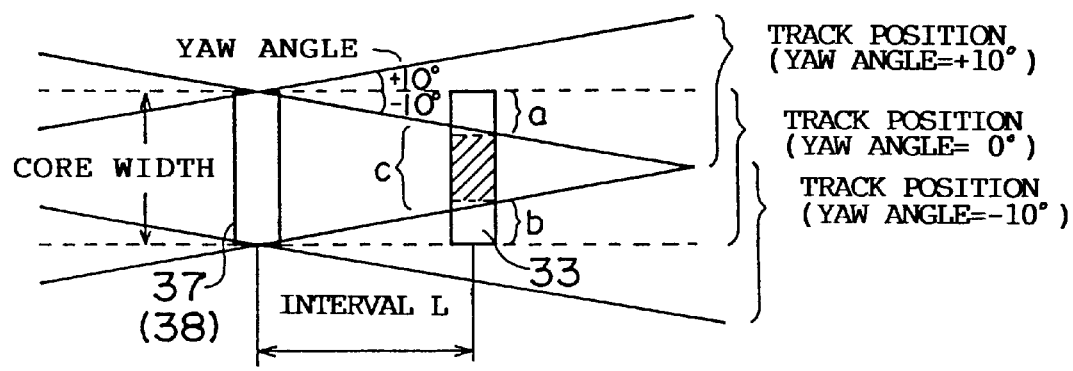
FIGS. 3A and 3B show illustrations for explaining a conventional method of setting a track pitch.
Figure 3B:
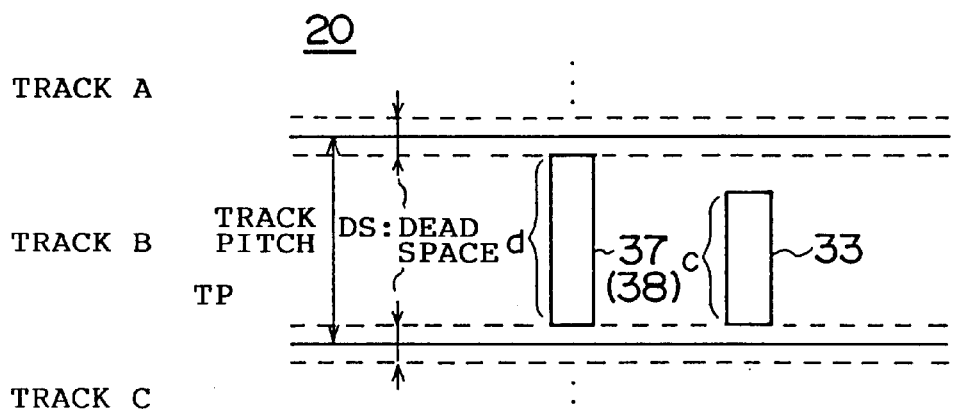
Figure 4:
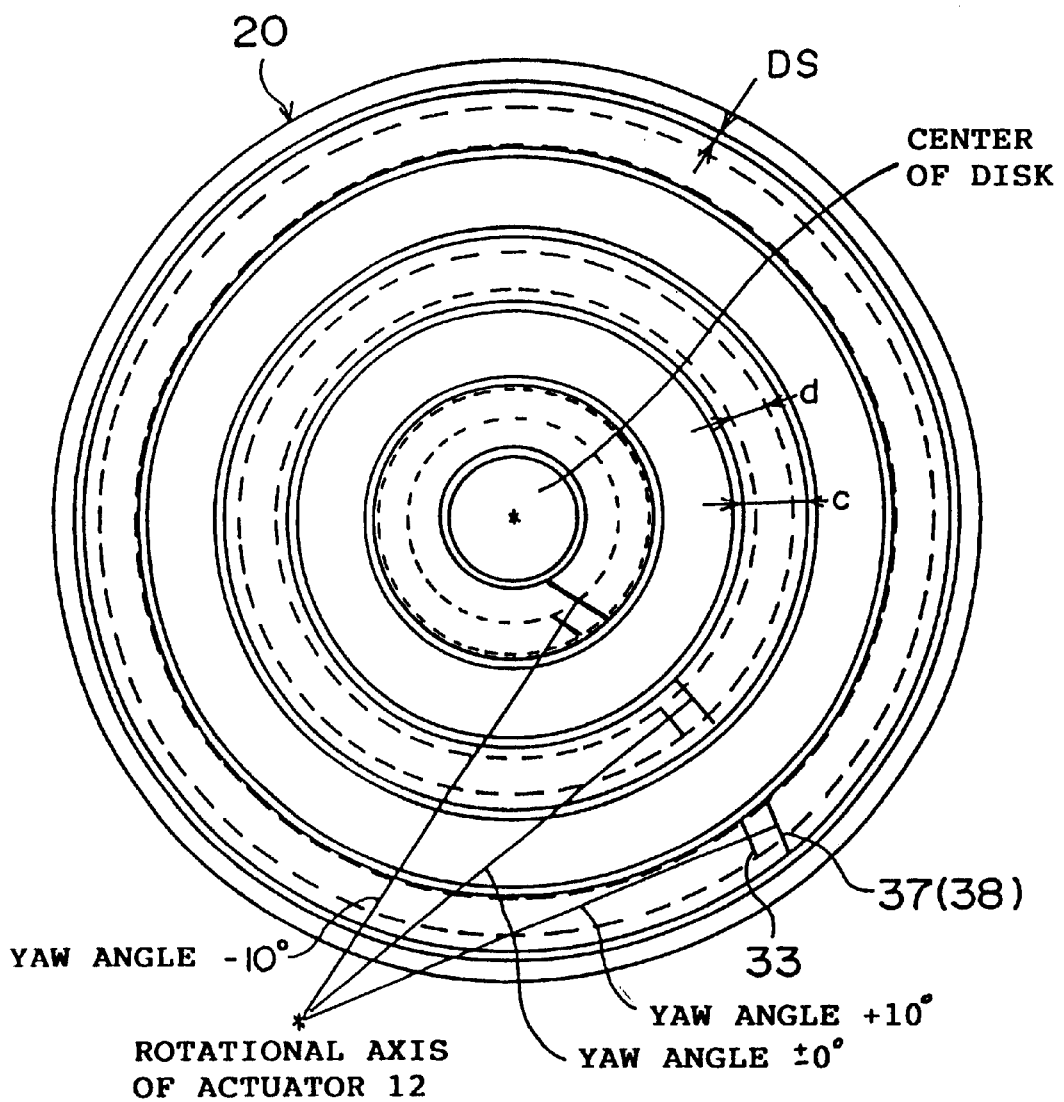
FIG. 4 shows an illustration for explaining a position relationship between a magnetic head and the track in FIGS. 3A, 3B.

As mentioned above, the dead space DS (DSe1-Ymgn1, or DSe2-Ymgn2) is a space between recording areas of two adjoining tracks. Therefore, according to the present invention, in the center track with the minimum YAW angle, the track pitch TP can be reduced by the margin Ymgn1 or Ymgn2 as compared to the prior art shown in FIG. 3B to obtain the same dead space DS as that of the prior art.

The above description shows the case when the YAW angle is minimum, i.e., 0 degrees. In this case, as the absolute value of the YAW angle is increased, actual margins are decreased from the margins Ymgn1, Ymgn2 according to the YAW angle, and the actual margins are zero at the maximum YAW angle. Namely, as the YAW angle is increased, the actual dead space is decreased from DSe1 and DSe2 to DS. Therefore, by changing the dead space DS according to the actual margins based on the YAW angle, the track pitch (TP) is changed.

According to the present invention, in the magnetic disk 52, the track pitch (TP) goes to the high density, from the outer track and the inner track in which the YAW angle is maximum and the actual margins are minimum to the center track in which the YAW angle is minimum (0 degree) and the actual margins are maximum Ymgn1, Ymgn2.

In the above formatting method, surplus dead space is removed. The removal makes it possible to reduce the track pitch (TP) according to the above derived equation (3), TP=c+e+DS, without affecting the width of the thin-film head 55a (and the MR head 55b) and the characteristics thereof, so that the packing density (TPI) may be increased.

Figure 8:
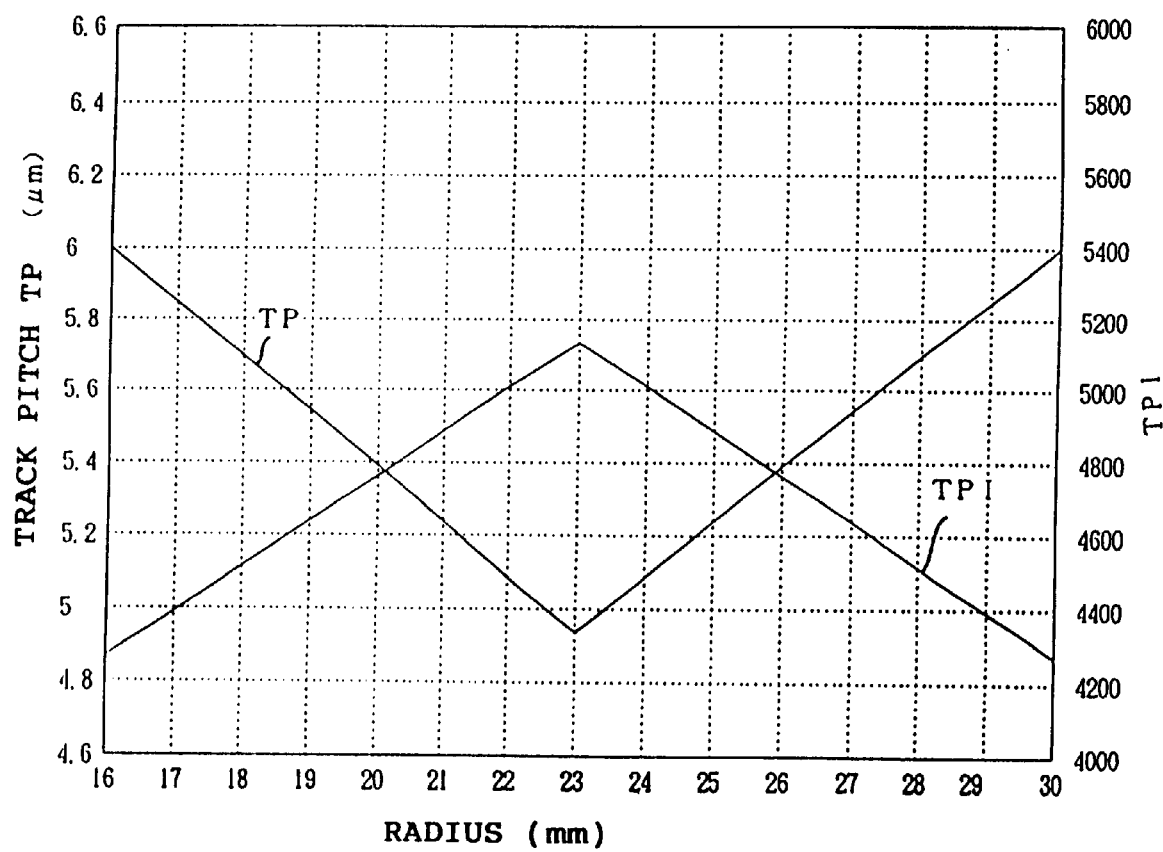
FIG. 8 shows a graphical representation for indicating relationships between the radius of the magnetic disk (for example, a 2.5-inches-magnetic disk) and the track pitch TP ($\mu$m), and between the radius of the magnetic disk and the number of the tracks per an inch TPI.

FIG. 8 shows a graphical representation for indicating relationships between the radius of the magnetic disk 52 (for example, a 2.5-inches-magnetic disk) and the track pitch TP ($\mu$m), and between the radius of the magnetic disk 52 and the number of tracks per inch TPI according to the present invention in which surplus dead space is removed based on the method described above with respect to FIG. 7. This graph indicates the TPI table of the disk apparatus according to the present invention.

In FIG. 8, the write core width of the thin-film head 55a is 5.0 $\mu$m, the interval L between the thin-film head 55a and the MR head 55b is 5.0 $\mu$m, a range of the YAW angle is 24 degree (±12 degree), the radius of the inner track of the 2.5-inches-magnetic disk 52 is 16.00 mm, the radius of the outer track thereof is 30.00 mm, and the actual dead space (the smaller one of DSe1 and DSe2) is 1.0 $\mu$m.

As shown in FIG. 8, at the radius of 23 mm indicating the minimum YAW angle (0 degree), the track pitch TP is at its minimum and the number of tracks per inch TPI is at its maximum. Therefore, across the radius of the magnetic disk 52, the track pitch TP changes from 6.0 to 4.94 $\mu$m, and the number of tracks per inch TPI changes from 4233 to 5144.

In the conventional method, in the 2.5-inches-magnetic disk, when the track pitch TP is 6.0 $\mu$m, the number of tracks per inch TPI has a constant value of 4233 across the radius of the magnetic disk. Therefore, according to the present invention, in the 2.5-inches-magnetic disk, the packing density can be increased by approximately 15%.

The graph shown in FIG. 8 is stored in the TPI table 62 shown in FIG. 5. The magnetic disk 52 is formatted in a track format indicated by the TPI table by a servo track writer, STW (not shown in FIG. 5), previously located in the magnetic disk apparatus. In the formatting by the STW, generally by using a laser light, the head positioning is carried out with the different track pitches according to the above mentioned TPI table, and the track format is recorded including the servo information.

Figure 9:
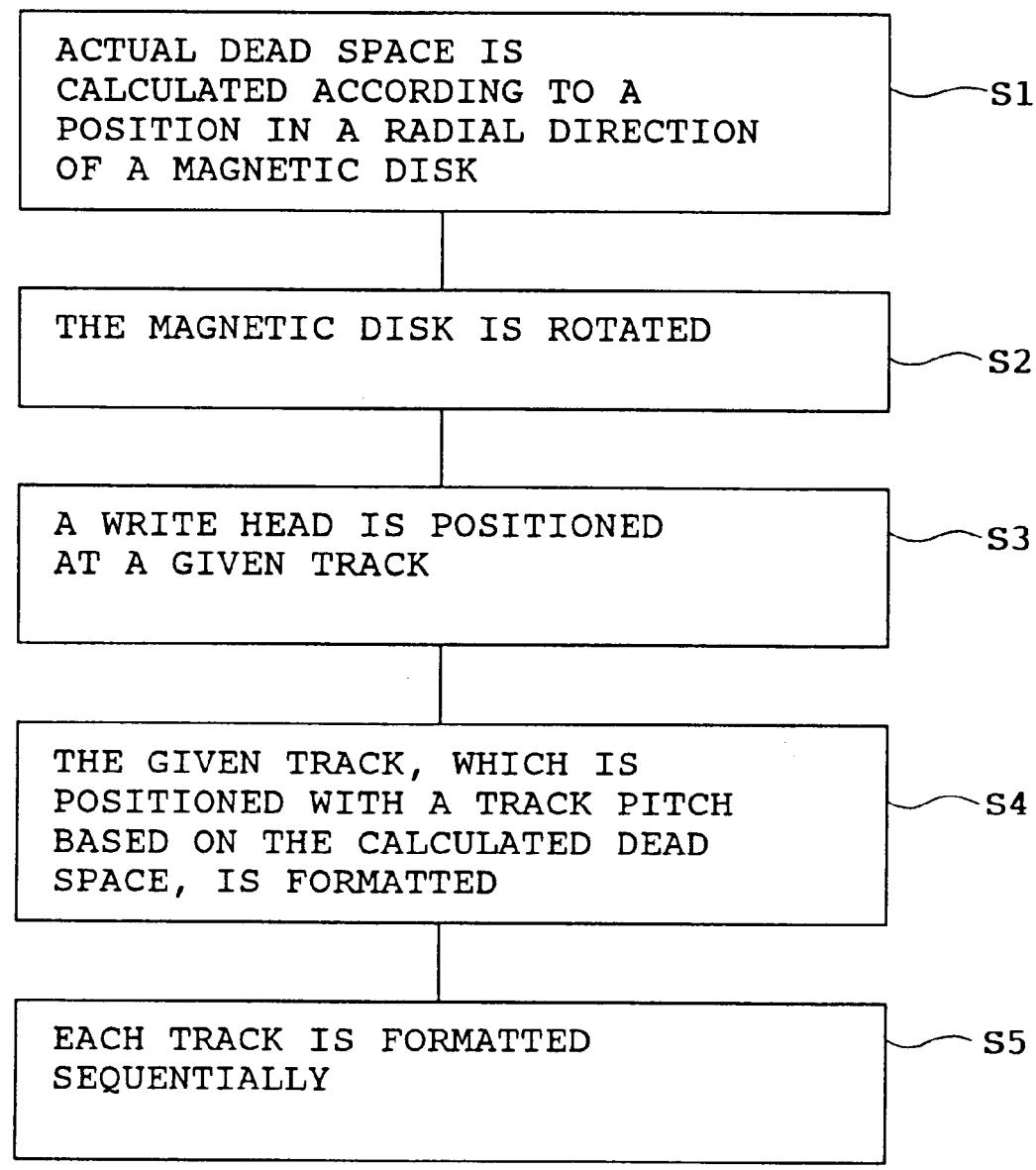
FIG. 9 shows procedures of the formatting method of the disk medium according to the present invention.

FIG. 9 shows procedures of the formatting method of the disk medium according to the present invention. In FIG. 9, previously, the actual dead space is calculated according to the position in the radial direction of the magnetic disk 52 (step S1). Next, the magnetic disk to be formatted is rotated by the DCM 53 shown in FIG. 5 (step S2). The write head 55a of the magnetic head 55 shown in FIG. 5 is positioned at a given track by the laser light of the above-discussed STW (not shown) (step S3). The given track, which is positioned with the track pitch based on the calculated dead space, is formatted by the write head 55a of the magnetic head 55 (step S4). Each track is formatted sequentially using the STW according to the TPI table (step S5).

Returning to FIG. 5, the servo control will be described with respect to the magnetic disk 52 in which the packing density has been improved. The servo signal recorded on the magnetic disk 52 is read out by the magnetic head 55 and is transmitted to the servo demodulation circuit 57 through the head IC 56. In the servo demodulation circuit 57, the servo signal is converted to the position signal indicating the position information in the radius of the magnetic disk 52.

In the ADC 58, the position signal is converted to the digital signal which is supplied to the DSP 59. The DSP 59 receives the TPI from the TPI table 62 according to the position signal in digital-data form, and calculates conditions of the magnetic head 55 (present position and moving speed) to produce a proper seek control signal.

The seek control signal is converted, in the DAC 60, to the analog signal, which drives the VCM 54 through the VCM driving circuit 61.

In the DSP 59, the seek control signal is obtained by calculating the movement of the magnetic head 55 based on a signal information derived from the position of the head and a time of the movement through the track which are derived from the position signal. Since the TPI has different values in the radial direction and the magnetic head 55 moves at a constant speed, a conventional calculation for the moving speed shows that the moving speed changes in the radial direction of the magnetic disk. For example, the conventional calculation shows that as the TPI is increased, the time of the movement through the track is decreased and the moving speed of the head is increased.

To obtain an accurate moving speed of the magnetic head, according to the present invention, the TPI information at a present position is derived from the TPI table 62 which is prepared for each radius of the magnetic disk, and the moving speed is calculated based on the TPI information. As a result, the proper seek control signal is obtained.

Figure 10:
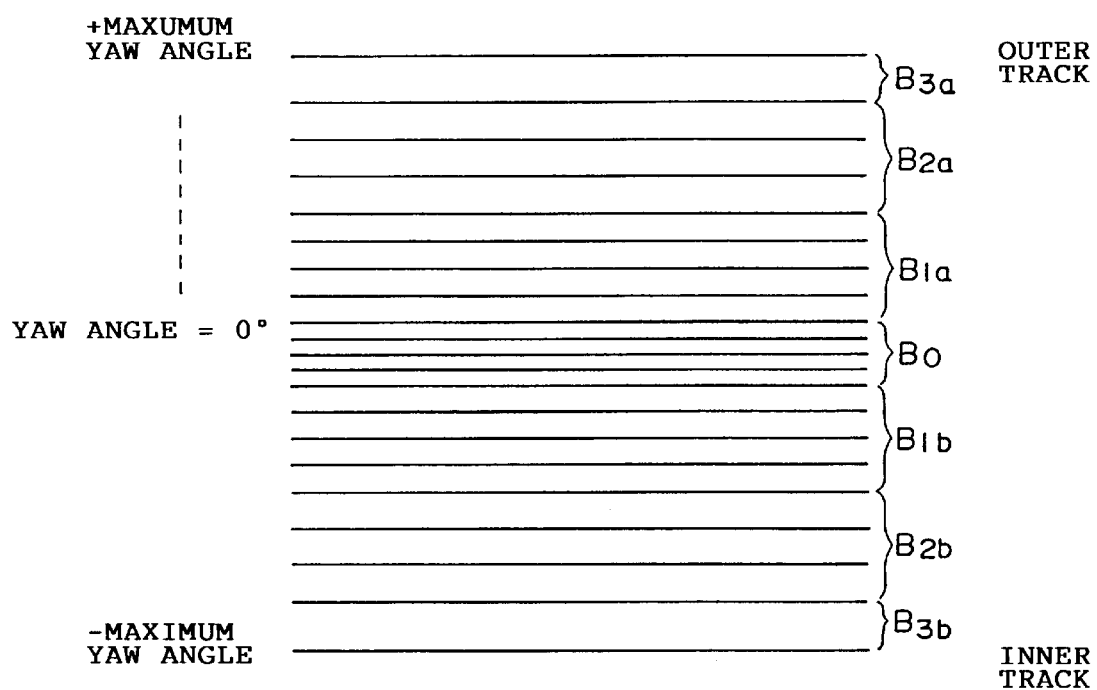
FIG. 10 shows an illustration for explaining another condition of the track pitch of the magnetic disk shown in FIG. 5.

FIG. 10 shows an illustration for explaining another condition of the track pitch of the magnetic disk 52 shown in FIG. 5. In the condition of the track pitch shown in FIG. 6A, the track pitch is sequentially (linearly) decreased in the direction from the outer track and the inner track to the center track of the minimum YAW angle (0 degree). While, in the condition of the track pitch shown in FIG. 10, the TPI table 62 is stored with information which would divide the tracks of the magnetic disk into a plurality of block zones in the radial direction. The track pitch is set to decrease in block zones in the direction from outer and inner block zones to a center block zone.

In FIG. 10, the track pitch goes to the higher density format in a step change from the outer block zone B3a to the center block zone B0, and also the track pitch goes to the higher density format in the step change from the inner block zone B3b to the center block zone B0. Accordingly, the packing density of the disk medium may be improved.

Further, the present invention is not limited to these embodiments, but various variations and modifications may be made without departing from the scope of the present invention.

What is claimed is:

1. A disk apparatus comprising:
    a disk medium for recording information in a track provided on said disk medium;
    rotation means for rotating said disk medium;
    a head for recording-and-reproducing to-and-from said disk medium, said head comprising:
    a recording head element;
    a reproducing head element, said recording head element and said reproducing head element being arranged along the track while separated from each other by a given distance; and
    driving control means for swinging said head to a given track position in a radial direction of said disk medium;
    wherein said disk medium is formatted by changing a track pitch in said radial direction of said disk medium, said track pitch being increased in said radial direction as a YAW angle is increased.

2. The disk apparatus as claimed in claim 1, wherein said track pitch is decreased toward a center of a radius of said disk medium.

3. The disk apparatus as claimed in claim 1, wherein said track pitch is at a minimum pitch at a position where said YAW angle is at a minimum angle.

4. The disk apparatus as claimed in claimed 3, wherein said track pitch is sequentially decreased as said YAW angle is decreased to said minimum angle in said radial direction of said disk medium.

5. The disk apparatus as claimed in claim 3, wherein said disk medium comprises a plurality of regions in said radial direction, and said track pitch is decreased in each region as said YAW angle is decreased to said minimum angle in said radial direction of said disk medium.

6. A disk apparatus comprising:
    a disk medium in which tracks are formatted with a track pitch change in a radial direction of said disk medium, said tracks storing servo information;
    a head for recording-and-reproducing to-and-from said disk medium, said head comprising:
    a recording head element;
    a reproducing head element, said recording head element and said reproducing head element being arranged along said tracks while separated from each other by a given distance;
    wherein said track pitch is increased in the radial direction as a YAW angle is increased;
    storage means for storing track density information according to said track pitch of said disk medium;
    processing means for obtaining a position of said head based on said servo information which is read out from said tracks of said disk medium and said track density information derived from said storage means, and for producing a drive control signal; and
    driving control means for swinging said head to a given position in said radial direction of said disk medium according to said drive control signal from said processing means.

7. The disk apparatus as claimed in claim 6, wherein said track pitch is decreased toward a center of a radius of said disk medium.

8. The disk apparatus as claimed in claim 6, wherein said track pitch is at a minimum pitch at a position where said YAW angle is at a minimum angle.

9. The disk apparatus as claimed in claim 8, wherein said track pitch is sequentially decreased as said YAW angle is decreased to said minimum angle in said radial direction of said disk medium.

10. The disk apparatus as claimed in claim 8, wherein said disk medium comprises a plurality of regions in said radial direction, and said track pitch is decreased in each region as said YAW angle is decreased to said minimum angle in said radial direction of said disk medium.

11. A method of formatting a disc medium in a disk apparatus for recording information, said disk apparatus having a plurality of tracks, a head including a recording head element and a reproducing head element which are arranged along the tracks, and separated from each other by a given distance, and driving control means for swinging the head to a given position in a radial direction of the disk medium, the method comprising the steps of:
    (a) obtaining a track pitch at a position of a given track to be formatted so that said track pitch is changed in the radial direction, said track pitch being increased as a YAW angle is increased;
    (b) positioning the head to said position based on said track pitch;
    (c) formatting said given track at said position; and
    (d) formatting each of the plurality of tracks in the same way as steps (a) to (c).

12. The method as claimed in claim 11, wherein said step (a) comprises a step (a-1) of determining a maximum value of said track pitch based on a positioning accuracy of the head.

13. The method as claimed in claims 12, wherein said step (a) comprises a step (a-2) of obtaining said track pitch so that said track pitch is decreased as said YAW angle is decreased to a minimum in the radial direction of the disk medium.

14. The method as claimed in claim 12, wherein said step (a-1) comprises a step (a-3) of obtaining said track pitch by subtracting a margin determined according to said position from said maximum requirement value of the track pitch.

15. A disk medium to be used in a disk apparatus comprising:
    a head formed of two elements having a distance therebetween;
    an arm for moving said head to traverse the disk medium;
    a storage medium having information for formatting a plurality of tracks on the disk medium, said tracks being formatted with a track pitch changed in a radial direction of the disk medium, and said track pitch being decreased in a direction of a position where a YAW angle is minimum in the radial direction of the disk medium so said track pitch decreases as said YAW angle decreases.

* * * * *